US012570301B2

(12) United States Patent
Nishimoto et al.

(10) Patent No.: US 12,570,301 B2
(45) Date of Patent: Mar. 10, 2026

(54) DRIVING ASSISTANCE DEVICE AND DRIVING ASSISTANCE METHOD

(71) Applicant: TOYOTA JIDOSHA KABUSHIKI KAISHA, Toyota (JP)

(72) Inventors: Tatsuya Nishimoto, Susono (JP); Shinya Kawamata, Mishima (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 18/887,388

(22) Filed: Sep. 17, 2024

(65) Prior Publication Data

US 2025/0121838 A1      Apr. 17, 2025

(30) Foreign Application Priority Data

Oct. 17, 2023      (JP) ................................. 2023-178597

(51) Int. Cl.
B60W 50/06           (2006.01)
B60W 30/18           (2012.01)
B60W 60/00           (2020.01)

(52) U.S. Cl.
CPC ...... B60W 50/06 (2013.01); B60W 30/18009 (2013.01); B60W 60/001 (2020.02); B60W 2554/4046 (2020.02)

(58) Field of Classification Search
CPC ........... B60W 50/06; B60W 30/18009; B60W 60/001; B60W 2554/4046; B60W 30/18109; B60W 2556/10; B60W 2556/50
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,064,419 | B2 * | 6/2015 | Aoki ...................... G08G 1/166 |
| 9,174,643 | B2 | 11/2015 | Aso |
| 10,017,178 | B2 | 7/2018 | Morimoto et al. |
| 10,118,617 | B2 | 11/2018 | Urano et al. |
| 10,486,698 | B2 | 11/2019 | Masui et al. |

(Continued)

FOREIGN PATENT DOCUMENTS

JP          2009-103570 A      5/2009

*Primary Examiner* — Richard M Camby
(74) *Attorney, Agent, or Firm* — SoraIP, Inc.

(57)          ABSTRACT

When the vehicle reaches the deceleration position where the driver performs the deceleration operation, the driving assistance device executes deceleration control for automatically decelerating the vehicle. The driving assistance device adds a larger score to the learning score of the deceleration position than the case where it is determined that the deceleration operation is performed due to the deceleration request object provided in front of the deceleration position and the vehicle needs to decelerate, and the deceleration operation is not performed due to the deceleration request object, on the basis of the environment in front of the vehicle when the driver performs the deceleration operation, and executes the deceleration control when the learning score of the deceleration position reached by the vehicle is equal to or larger than the threshold value.

4 Claims, 5 Drawing Sheets

(56)                    References Cited

U.S. PATENT DOCUMENTS

| | | | | |
|---|---|---|---|---|
| 2013/0204460 A1* | 8/2013 | Uno | ............... | B60W 30/18154<br>701/1 |
| 2014/0309903 A1* | 10/2014 | Otake | .................... | G08G 1/166<br>701/70 |
| 2016/0144861 A1* | 5/2016 | Cao | .................... | B60W 30/181<br>701/22 |
| 2019/0295419 A1 | 9/2019 | Tosa et al. | | |

* cited by examiner

DRIVING ASSISTANCE DEVICE AND DRIVING ASSISTANCE METHOD

CROSS-REFERENCE TO RELATED APPLICATION

This application claims priority to Japanese Patent Application No. 2023-178597 filed on Oct. 17, 2023, incorporated herein by reference in its entirety.

BACKGROUND

1. Technical Field

The present disclosure relates to a driving assistance device and a driving assistance method for executing deceleration control for automatically decelerating a vehicle when the vehicle reaches a deceleration position where a deceleration operation was performed.

2. Description of Related Art

A driving assistance device described in Japanese Unexamined Patent Application Publication No. 2009-103570 (JP 2009-103570 A) (hereinafter referred to as "related-art device") creates map information by associating a change in a driver's operation with position information when the operation changed. When the vehicle reaches a "position indicated by the position information when the operation changed", control gains are changed based on the type of the operation performed by the driver. For example, when the change in the operation is "turning on braking", the related-art device reduces an acceleration gain of a driving force control device and increases a braking gain of a braking control device.

SUMMARY

The related-art device does not determine whether a deceleration operation performed by the driver is a deceleration operation that needs to be performed every time the vehicle passes through the position in the future or is a one-time deceleration operation. It is not preferable that the vehicle automatically decelerates at the position where the one-time deceleration operation was performed. In order to prevent the related-art device from learning the position where the one-time deceleration operation was performed as a "deceleration position for executing deceleration control", a predetermined number of deceleration operation records or more are required. Therefore, when the vehicle travels on a new route, the vehicle needs to travel on the route many times before the learning of the deceleration positions on the route is completed.

The present disclosure has been made to address the above issue. That is, an object of the present disclosure is to provide a driving assistance device capable of reducing a period required until learning of a deceleration position is completed.

A driving assistance device of the present disclosure (hereinafter referred to as "invented device") is configured to execute deceleration control for automatically decelerating a vehicle when the vehicle reaches a deceleration position where a driver performed a deceleration operation. The driving assistance device is configured to: when determination is made, based on an environment ahead of the vehicle at a time when the driver performed the deceleration operation, that the deceleration operation was performed due to a deceleration request object that was provided ahead of the deceleration position and required the vehicle to decelerate, add a higher score to a learning score of the deceleration position than a score when determination is made that the deceleration operation was not performed due to the deceleration request object; and execute the deceleration control when the learning score of the deceleration position reached by the vehicle is equal to or higher than a threshold value.

When the deceleration operation was performed in a case where the deceleration request object such as a stop line, a stop sign, a red signal, or a curve road was present ahead of the vehicle, there is a strong possibility that the deceleration operation will be performed every time the vehicle passes through the position in the future. In the invented device, when determination is made, based on the environment ahead of the vehicle at the time when the driver performed the deceleration operation, that the deceleration operation was performed due to the deceleration request object, a higher score is added to the learning score of the deceleration position than a score added otherwise. The deceleration control is executed when the learning score of the deceleration position reached by the vehicle is equal to or higher than the threshold value. Thus, it is possible to reduce the period required until the learning of the deceleration position is completed while reducing the possibility that the deceleration control is erroneously executed at the deceleration position where the one-time deceleration operation was performed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
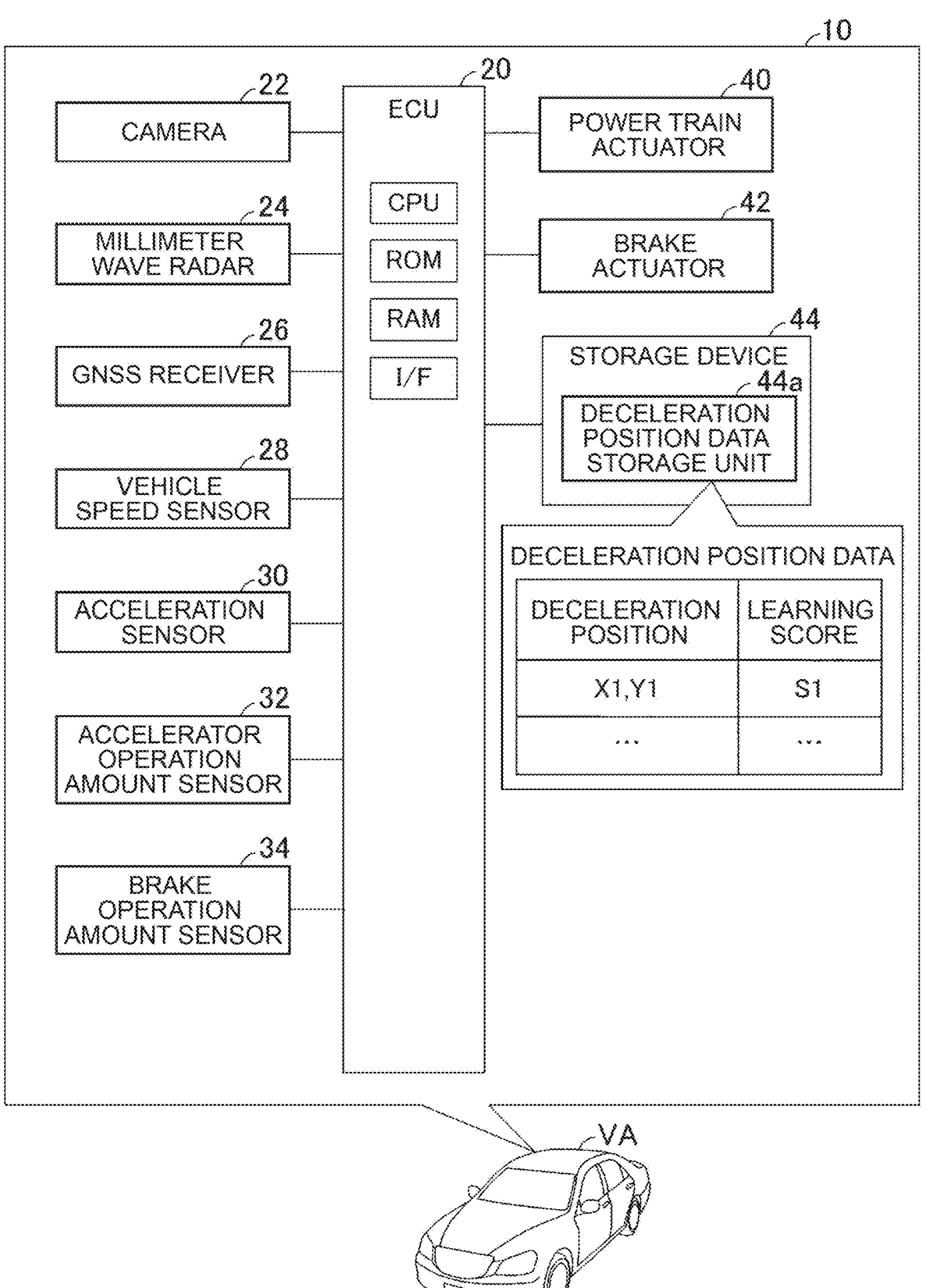
FIG. 1 is a schematic system configuration diagram of a driving assistance device according to an embodiment of the present disclosure.

As illustrated in FIG. 1, a driving assistance device 10 (hereinafter, referred to as "the device 10") according to the present embodiment is applied to a vehicle VA and includes components illustrated in FIG. 1.

ECU 20 executes deceleration control which is a kind of automated driving. In the deceleration control, ECU 20 automatically decelerates the vehicle VA.

In the present specification, "ECU 20" is an electronic control device including a microcomputer as a main part. ECU 20 are also referred to as control units, controllers and computers. The microcomputer includes a CPU (processor), a ROM, RAM, interfaces, and the like. The function realized by ECU 20 may be realized by a plurality of ECU.

The camera 22 captures an image of a scene in front of the vehicle VA. ECU 20 acquires images from the camera 22.

The millimeter wave radar 24 transmits millimeter waves forward of the vehicle VA. The millimeter-wave radar 24 identifies the "position of the object with respect to the vehicle VA" by receiving the reflected wave reflected by the object by the transmitted millimeter wave. ECU 20 obtains radar object information including the position of the object with respect to the vehicle VA from the millimeter-wave radar 24.

GNSS receiver 26 receives signals from a plurality of satellites and identifies the present position (latitude and longitude) of the vehicle VA based on the received signals.

The vehicle speed sensor 28 detects the vehicle speed Vs. The acceleration sensor 30 detects an acceleration G in the front-rear axial direction of the vehicle VA. The accelerator operation amount sensor 32 detects an operation amount (accelerator operation amount) AP of an accelerator pedal (not shown) of the vehicle VA. The brake operation amount sensor 34 detects an operation amount (brake operation amount) BP of a brake pedal (not shown) of the vehicle VA. ECU 20 obtains the detections of these sensors.

The powertrain actuator 40 changes a driving force generated by a driving device (for example, an internal combustion engine and/or an electric motor) of the vehicle VA. The brake actuator 42 controls a braking force applied to the vehicle VA.

The storage device 44 has a non-volatile storage area. In this storage area, a deceleration position data storage unit 44a is provided. The deceleration position data storage unit 44a stores deceleration position data. In the deceleration position data, the deceleration position representing the position of the vehicle VA when the driver performs the deceleration operation and the learning score S are registered in association with each other.

Overview of Operation

When the driver performs the deceleration operation, the device 10 stores the position (deceleration position) of the vehicle VA and the learning score S when the deceleration operation is performed in the deceleration position data. When the vehicle VA reaches the deceleration position, the device 10 executes the deceleration control when the learning score S of the deceleration position is equal to or greater than the threshold Sth, and does not execute the deceleration control when the learning score S is less than the threshold Sth.

The device 10 determines whether or not a deceleration request object exists based on the image data and the radar object information when the driver performs the deceleration operation. The deceleration request object is an object provided in front of the vehicle VA and requesting deceleration of the vehicle VA. For example, the deceleration request is a pause line, a pause sign, a red signal, a curve path, and the like.

The device 10 determines that the deceleration operation is performed due to the deceleration requesting object when the deceleration requesting object is present, and determines that the deceleration operation is performed without being performed due to the deceleration requesting object when the deceleration requesting object is not present. In this case, in the device 10, when the deceleration operation is performed without being caused by the deceleration requesting object, the score (Snor or Spre) is added to the learning score S of the deceleration position. When the deceleration is performed due to the deceleration requesting object, the score Sreq is added to the learning score S of the deceleration position. The score Sreq is set to be larger than the score (Snor or Spre).

When the deceleration operation is performed due to the deceleration request object, there is a high possibility that the driver needs to perform the deceleration operation every time the vehicle passes through the deceleration position thereafter. According to the device 10, when the deceleration operation is performed due to the deceleration requesting object, a larger score than when the deceleration operation is performed without being performed due to the deceleration requesting object is added to the learning score S of the deceleration position. As a result, it is possible to reduce the time until the learning of the deceleration position is completed while reducing the possibility that the deceleration control is performed at the deceleration position where the temporary deceleration operation is performed.

Specific Operation

Figure 2:
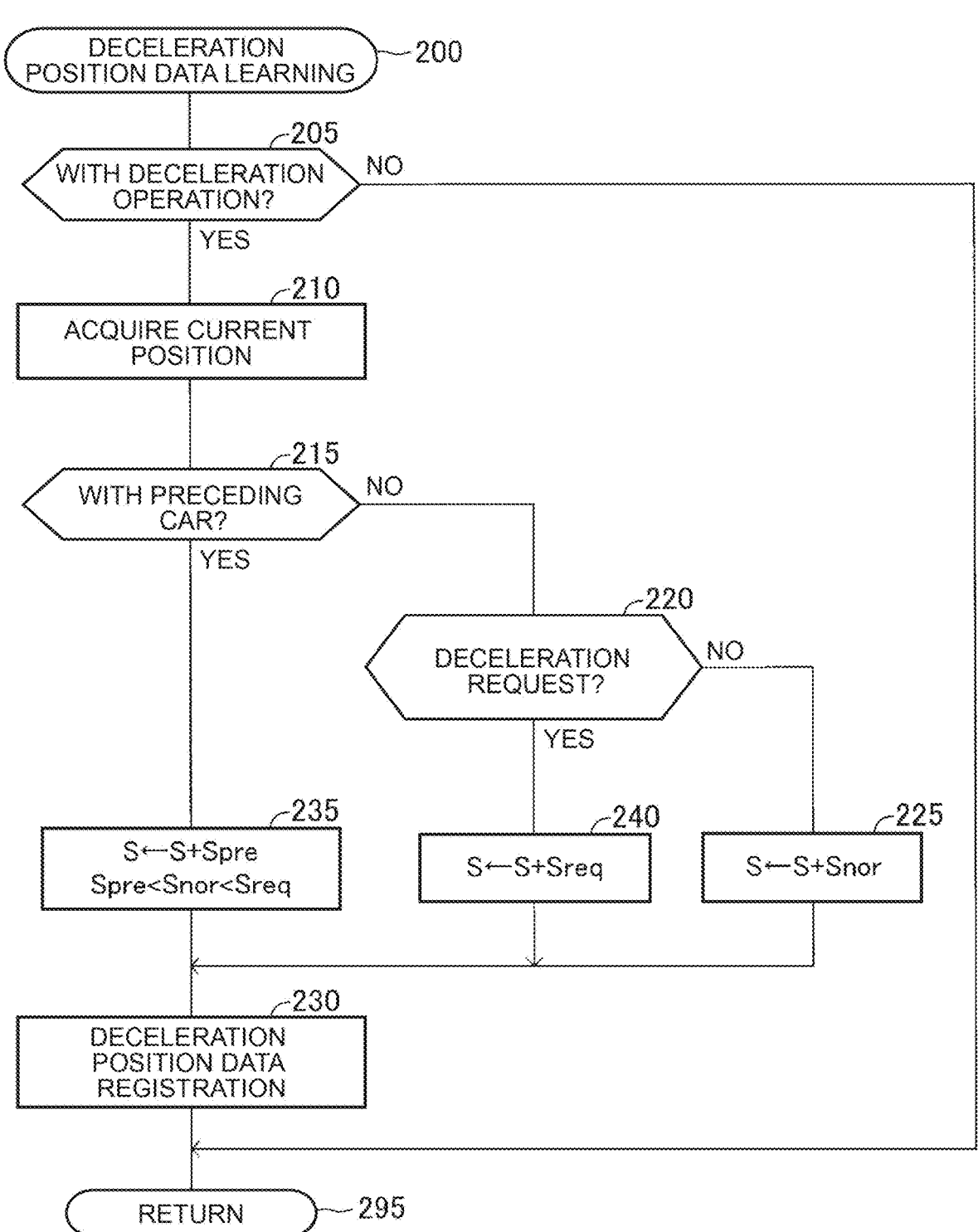
FIG. 2 is a flow chart of a deceleration position data learner executed by CPU of ECU shown in FIG. 1.
Figure 3:
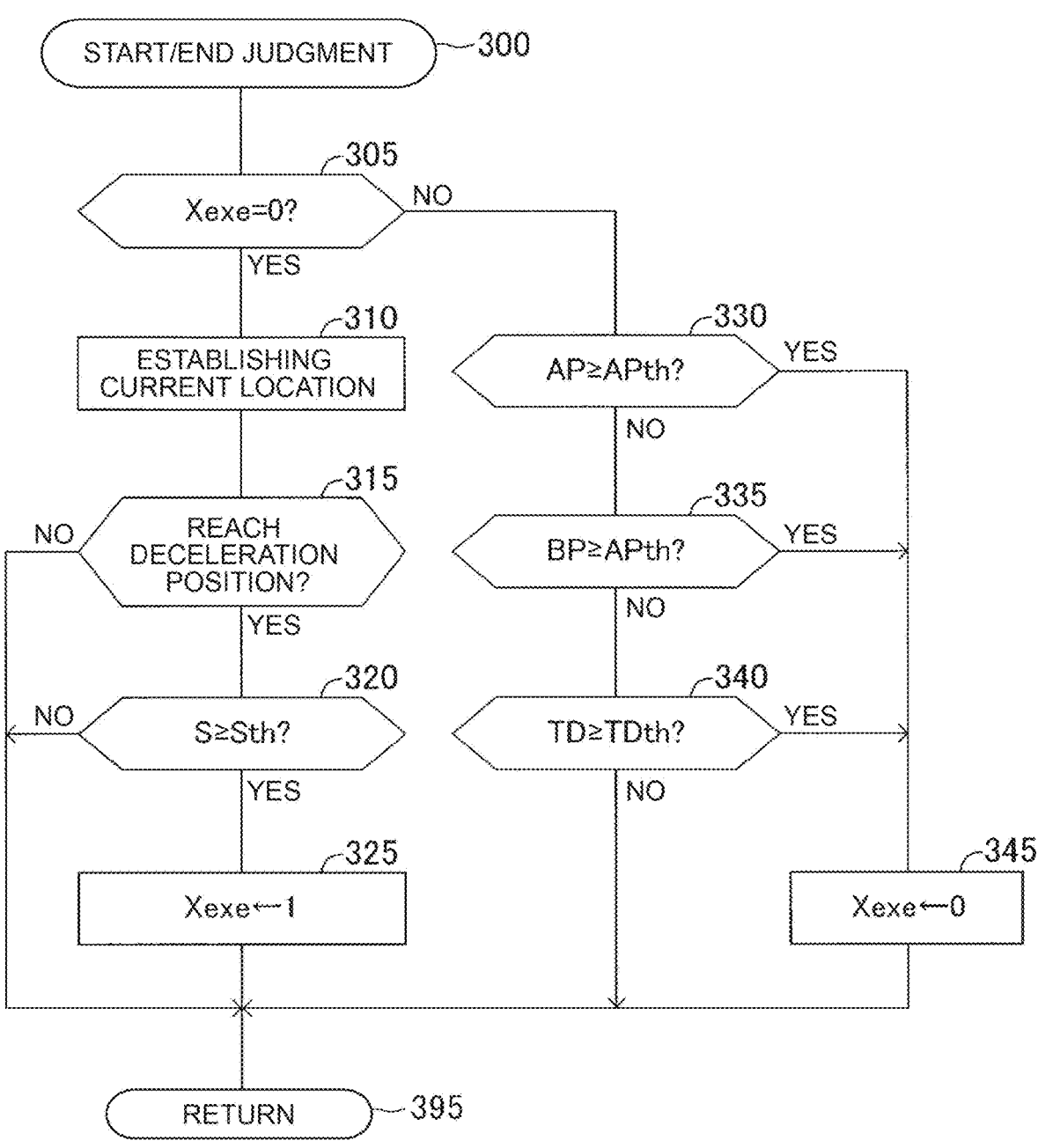
FIG. 3 is a flow chart of a start/end determination routine executed by CPU of ECU shown in FIG. 1.
Figure 4:
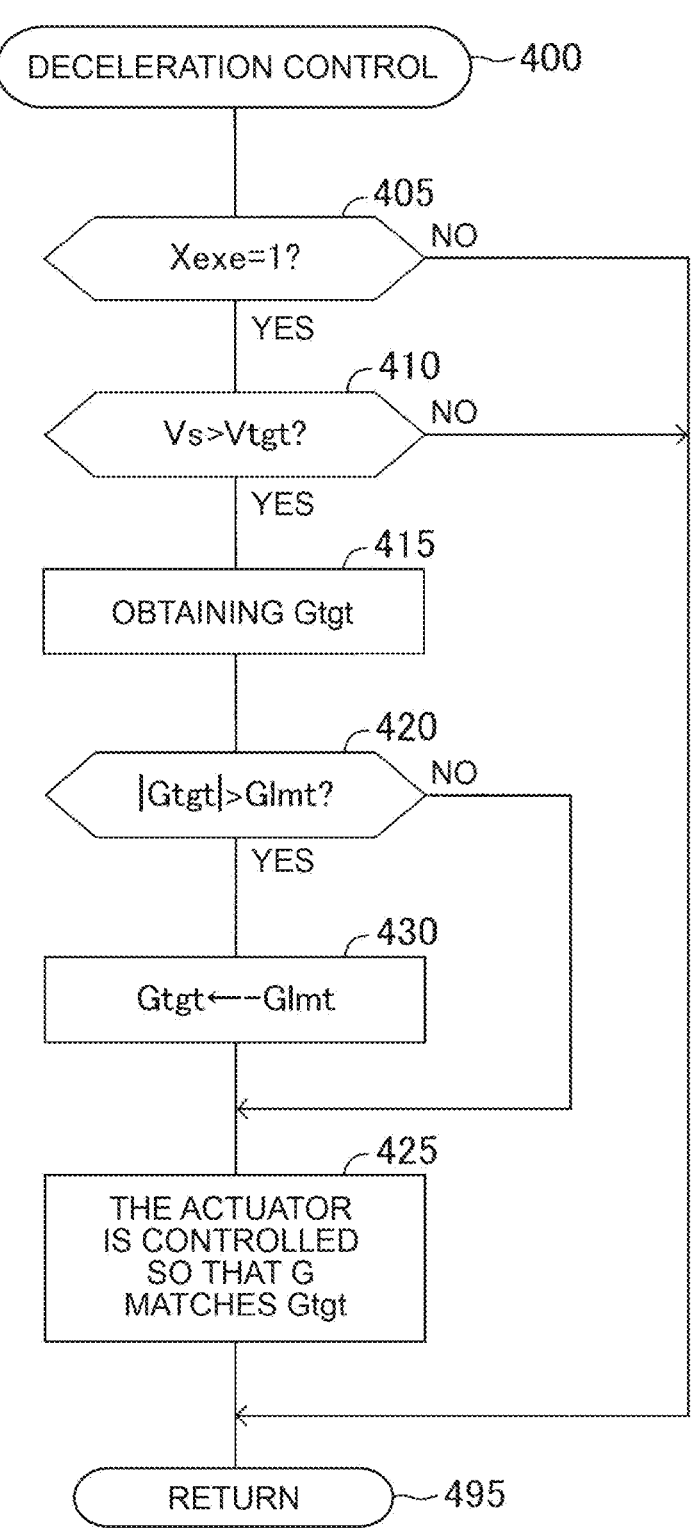
FIG. 4 is a flow chart of a deceleration control routine executed by CPU of ECU shown in FIG. 1.

CPU of ECU 20 is executed every time a predetermined period of time elapses in the routines illustrated by the flow charts in FIGS. 2 to 4.

Deceleration Position Data Learning Routine

When the appropriate time point has arrived, CPU starts the process from step 200 of FIG. 2, and in step 205, CPU determines whether or not a deceleration operation has been performed based on the detected value from the brake operation amount sensor 34.

If the deceleration operation is not performed, CPU determines "No" in step 205, and the process proceeds to step 295 and CPU ends the routine. On the other hand, when the deceleration is performed, CPU determines "Yes" in step 205, and sequentially executes step 210 and step 215.

The stepping 210: CPU obtains the present position of the vehicle VA from GNSS receiver 26.

The stepping 215: CPU determines whether or not a preceding vehicle is present based on the image-data and the radar object-information. The preceding vehicle is a vehicle that travels in front of the vehicle VA.

If there is no preceding vehicle, CPU determines "No" in step 215, and the process proceeds to step 220. In step 220, CPU determines whether there is a deceleration demand based on the image-data.

More specifically, CPU extracts a white line from the image-data, and determines whether or not there are a pause line and a curve line based on the extracted white line. Further, CPU determines that the pause indicator is present when an image registered in advance and an image having a degree of similarity equal to or greater than a threshold value are included in the image data. Similarly, CPU determines that a red signal is present when the image data includes an image having a degree of similarity equal to or greater than a threshold value with an image of a red signal registered in advance.

It should be noted that CPU may determine whether or not there is a deceleration requesting object based on the map data instead of the image data. In the map data, the positions of the pause line, the pause sign, the red signal, and the curve path are registered. Specifically, CPU determines that there is any one of the pause line, the pause sign, the red signal, and the curve path within a predetermined distance ahead of the present position of the vehicle VA.

If there is no deceleration demand, CPU determines "No" in step 220 and performs steps 225 and 230.

In the step 225: CPU, a value obtained by adding the normal score Snor to the learning score S at the present position is set as a new learning score S.

When the record in which the present position is registered at the deceleration position of the deceleration position data does not exist in the deceleration position data, CPU adds a new record to the deceleration position data and sets the normal score Snor to the new learning score S.

The step 230: CPU registers a new learning score S in the learning score S of the record in which the deceleration position of the deceleration position data corresponds to the present position.

Thereafter, the process proceeds to step 295, and CPU ends the routine once.

If it is determined that there is a preceding vehicle when CPU proceeds to step 215, CPU determines "Yes" in step 215 and executes step 235.

In the step 235: CPU, a value obtained by adding the preceding vehicle score Spre to the learning score S of the present position is set as a new learning score S. The preceding vehicle score Spre is set to be smaller than the normal score Snor.

Thereafter, CPU executes step 230, the process proceeds to step 295, and CPU ends the routine once.

If there is a deceleration demand when CPU proceeds to step 220, CPU determines "Yes" in step 220 and executes step 240.

The step 240: CPU sets a value obtained by adding the deceleration request object score Sreq to the learning score S of the present position as a new learning score S. The deceleration demand object score Sreq is set to be larger than the normal score Snor.

Thereafter, CPU executes step 240, the process proceeds to step 295, and CPU ends the routine once.

Start/End Judgment Routine

When the appropriate time point has arrived, CPU starts the process from step 300 of FIG. 3, and in step 305, CPU determines whether or not the run flag Xexe is "0". The execution flag Xexe is set to "1" when the deceleration control starts, and is set to "0" when the deceleration control ends. In the initial routine, the execution flag Xon is set to "0". The initial routine is executed by CPU when an ignition key switch (not shown) of the vehicle VA is changed from the off-position to the on-position.

If the execution flag Xexe is "0", CPU determines "Yes" in step 305 and executes step 310 and step 315.

The stepping 310: CPU obtains the present position of the vehicle VA from GNSS receiver 26.

The step 315: CPU determines, based on the present position, whether the vehicle VA has reached any deceleration position registered in the deceleration position data.

If the vehicle VA has not reached any deceleration position, CPU determines "No" at step 315. Thereafter, the process proceeds to step 395, and CPU ends the routine once.

If the vehicle VA reaches any of the deceleration positions, CPU determines "Yes" in step 315, and the process proceeds to step 320. In step 320, CPU refers to the deceleration position data and determines whether or not the learning score S of the deceleration position reached by the vehicle VA is equal to or greater than the threshold Sth.

If the learning score S is less than the threshold Sth, CPU determines "No" at step 320. Thereafter, the process proceeds to step 395, and CPU ends the routine once.

If the learning score S is greater than or equal to the threshold Sth, CPU determines "Yes" in step 320, and the process proceeds to step 325. In this case, the start condition of the deceleration control is satisfied. In step 325, CPU sets the run flag Xexe to "1". Thereafter, the process proceeds to step 395, and CPU ends the routine once.

If the execution flag Xexe is "1" when the process proceeds to step 305, CPU determines "No" in step 305, and the process proceeds to step 330. In step 330, CPU determines whether the accelerator operation amount AP is greater than or equal to the threshold accelerator operation amount APth.

If the accelerator operation amount AP is less than the threshold accelerator operation amount APth, CPU determines "No" in step 330, and the process proceeds to step 335. In step 335, CPU determines whether the brake operation amount BP is greater than or equal to the threshold-brake operation amount BPth.

If the brake operation amount BP is less than the threshold brake operation amount BPth, CPU determines "No" in step 335, and the process proceeds to step 340. In step 340, CPU determines whether or not the travel distance TD traveled by the vehicle VA from the time when the starting condition is satisfied is equal to or greater than the threshold distance TDth.

If the travel distance TD is less than the threshold distance TDth, CPU determines "No" in step 340, and the process proceeds to step 395 and CPU ends the routine once.

When the accelerator operation amount AP is equal to or larger than the threshold accelerator operation amount APth (step 330 "Yes"), when the brake operation amount BP is equal to or larger than the threshold brake operation amount BPth (step 335 "Yes"), or when the travel distance TD is equal to or larger than the threshold distance TDth (step 340 "Yes"), the termination condition is satisfied. The process then proceeds to step 345, where CPU sets the run flag Xexe to "0". After that, the process proceeds to step 395, and CPU ends the routine once.

Deceleration Control Routine

When the appropriate time point has arrived, CPU starts the process from step 400 of FIG. 4, and in step 405, CPU determines whether or not the run flag Xexe is "1".

If the run flag Xexe is "0", CPU determines "No" in step 405. After that, the process proceeds to step 495, and CPU ends the routine once.

If the execution flag Xexe is "1", CPU determines "Yes" in step 405, and the process proceeds to step 410. In step 410, CPU determines whether the vehicle speed Vs is greater than the target vehicle speed Vtgt. The target vehicle speed Vtgt is set in advance to a predetermined value.

If the vehicle speed Vs is greater than the target vehicle speed Vtgt, CPU determines "Yes" in step 410 and performs steps 415 and 420.

Step 415: CPU, ECU 20 obtains the target acceleration Gtgt using Equation (1).

$$Gtgt = \alpha(Vtgt - Vs) \qquad \text{Equation (1)}$$

α is a weighting factor, and is set to a predetermined value greater than 0 and equal to or less than 1.

When the vehicle speed Vs is larger than the target vehicle speed Vtgt, the process proceeds to step 415, and since the target acceleration Gtgt is acquired, the target acceleration Gtgt becomes negative (in other words, the target acceleration Gtgt becomes deceleration).

The step 420: CPU determines whether or not the magnitude (|Gtgt|) of the target acceleration Gtgt is larger than a predetermined upper limit acceleration Glmt (a positive predetermined value).

When the magnitude (|Gtgt|) of the target acceleration Gtgt is equal to or smaller than the upper limit acceleration Glmt, CPU determines "No" in step 420, and the process proceeds to step 425. In step 425, CPU controls the powertrain actuator 40 and the brake actuator 42 such that the acceleration G coincides with the target acceleration Gtgt. After that, the process proceeds to step 495, and CPU ends the routine once.

If the magnitude (|Gtgt|) of the target acceleration Gtgt is greater than the upper limit acceleration Glmt, CPU determines "Yes" in step 420, and the process proceeds to step 430. In step 430, CPU sets the negative upper limit acceleration Glmt to the target acceleration Gtgt. Processing then proceeds to step 425.

According to the present embodiment, when the deceleration request object is present in front of the vehicle VA when the deceleration operation is performed, a larger deceleration request object Sreq is added than when the deceleration request object is not present. As a result, it is possible to reduce the time required for the learning of the deceleration position to be completed while reducing the possibility that the deceleration control is executed at the deceleration position where the temporary deceleration operation is performed.

First Modification

In the present modification, the exercise support system will be described. The exercise assistance device includes vehicles VAI to VAn and a storage server 50. Hereinafter, when the vehicle VAI to VAn do not need to be distinguished, these are referred to as vehicle VA. The vehicle VA and the storage server 50 are connected via a networked NW.

The vehicle VA comprises the components shown in FIG. 1. Further, the storage device 44 of the vehicle VA includes a temporary storage unit 44*b*. In this modification, each time the deceleration operation is performed, the vehicle VA stores the deceleration position data including the deceleration position at which the deceleration operation was performed and the learning score in the temporary storage unit 44*b* instead of the deceleration position data storage unit 44*a*. The vehicle VA transmits the deceleration position data stored in the temporary storage unit 44*b* to the storage server 50 and erases the deceleration position data stored in the temporary storage unit 44*b*. In one embodiment, ignition key switch is changed from the on-position to the off-position.

The storage server 50 includes CPU, ROM, RAM, interfaces (I/F), and storage devices 52. The storage device 52 has a deceleration position data storage unit 52*a* for storing deceleration position data transmitted by the vehicle VA.

The vehicle VA transmits, to the storage server 50, an acquisition request for acquiring deceleration position data of a predetermined range from the present position of the vehicle VA. The acquiring request includes the information about the present position of the vehicle VA. For example, when ignition key switch is changed from the off-position to the on-position, and when the number of deceleration positions belonging to the predetermined range from the present position of the vehicle VA is equal to or less than the predetermined number in the deceleration position data storage unit 44*a*.

When receiving the acquisition request, the storage server 50 selects the deceleration position data in which the learning score S is equal to or larger than the threshold Sth from the deceleration position data in the predetermined range from the present position of the vehicle VA. Then, the storage server 50 transmits the selected deceleration position data to the "vehicle VA that has transmitted the acquisition request". When deceleration position data is received from the storage server 50, the vehicle VA stores the deceleration position data in the received deceleration position data storage unit 44*a*.

When the acquisition request is received, the storage server 50 may transmit the deceleration position data of the predetermined range from the present position of the vehicle VA to the vehicle VA without determining whether or not the learning score S is equal to or greater than the threshold Sth. When the vehicle VA reaches the deceleration position, the driving assistance device 10 of the vehicle VA executes the deceleration control if the learning score S of the deceleration position is equal to or greater than the threshold Sth, and does not execute the deceleration control if the learning score S of the deceleration position is less than the threshold Sth.

According to this modification, since the deceleration position data of the plurality of vehicle VA is stored in the storage server 50, it is possible to further shorten the time until the deceleration position is learned.

Figure 5:
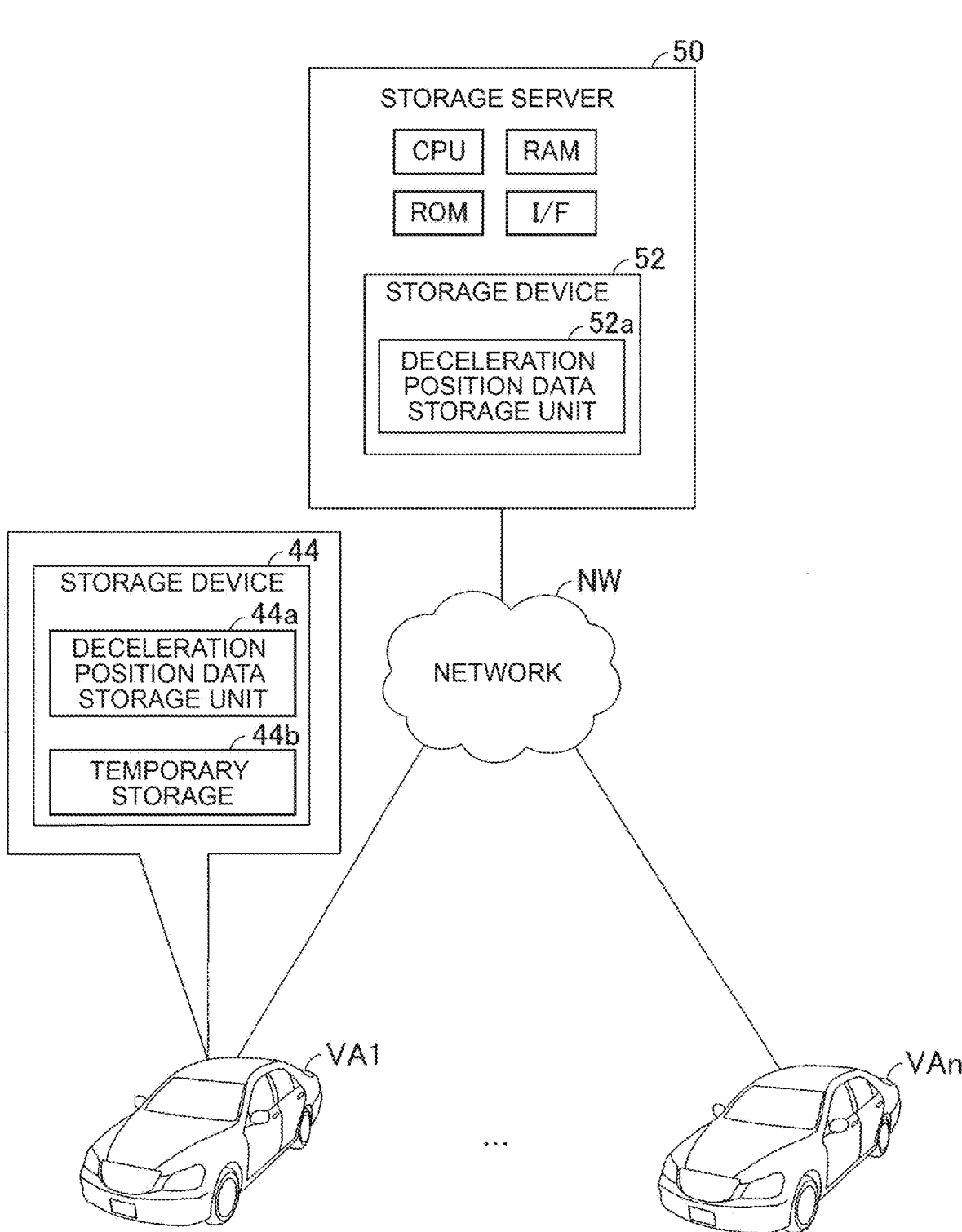
FIG. 5 is a schematic system configuration diagram of a driving assistance system according to a first modification of the embodiment of the present disclosure.

Although FIG. 5 illustrates an example in which a plurality of vehicles (learning vehicles) transmit the deceleration position data to the storage server 50, the number of learning vehicles may be one. The vehicle that is not the learning vehicle (that is, the vehicle that does not transmit the deceleration position data to the storage server 50) may acquire the deceleration position data from the storage server 50 and execute the deceleration control.

Second Modification

ECU 20 according to the present modification adds the scoring Sreq corresponding to the type of the deceleration request object when the deceleration operation is performed and the deceleration request object is present. When the deceleration request object is any of the pause line, the pause sign, and the curve path, ECU 20 adds the first score Sreq1 to the learning score S. If the deceleration request is a red signal, ECU 20 adds the second score Sreq2 to the learning score S.

The first score Sreq1 and the second score Sreq2 are preset to be larger than the normal score Snor. Further, the second score Sreq2 is preset to be smaller than the first score Sreq1. This is because the vehicle VA does not need to be stopped when the traffic light is green, whereas the vehicle VA must be decelerated when the vehicle VA travels on the pause line, the pause sign, and the curve road.

Third Modification

In ECU 20 according to the present modification, the deceleration control is strongly (largely) decelerated as the learning score S of the deceleration point at which the vehicle VA arrives is larger. Specifically, ECU 20 decreases the target vehicle speed Vtgt as the learning score S increases. ECU 20 may increase the upper limit acceleration Glmt as the learning score S increases.

The target acceleration Gtgt may be a fixed value. ECU 20 sets the target acceleration Gtgt (<0) to be smaller as the learning score S is larger.

The device 10 is applicable to vehicles such as engine vehicles, hybrid electric vehicle, plug-in hybrid vehicles, fuel cell electric vehicle, and battery electric vehicle.

What is claimed is:

1. A driving assistance device configured to execute deceleration control for automatically decelerating a vehicle when the vehicle reaches a deceleration position where a driver performed a deceleration operation, the driving assistance device being configured to:

when determination is made, based on an environment ahead of the vehicle at a time when the driver performed the deceleration operation, that the deceleration operation was performed due to a deceleration request object that was provided ahead of the deceleration position and required the vehicle to decelerate, add a higher score to a learning score of the deceleration position than a score when determination is made that the deceleration operation was not performed due to the deceleration request object; and execute the deceleration control when the learning score of the deceleration position reached by the vehicle is equal to or higher than a threshold value.

2. The driving assistance device according to claim 1, wherein the driving assistance device is configured to:

determine, based on the environment ahead of the vehicle, whether the deceleration operation was performed due to a preceding vehicle traveling ahead of the vehicle; and when determination is made that the deceleration operation was performed due to the preceding vehicle, add a lower score to the learning score of the deceleration position than a score when determination is made that the deceleration operation was performed due to neither the deceleration request object nor the preceding vehicle.

3. The driving assistance device according to claim 1, wherein the driving assistance device is configured to, when the learning score of the deceleration position is equal to or higher than the threshold value, decelerate the vehicle more strongly in the deceleration control as the learning score increases.

4. A driving assistance method for causing a first vehicle to execute deceleration control for automatically decelerating the first vehicle when the first vehicle reaches a deceleration position where a driver of a learning vehicle including at least one of the first vehicle and a second vehicle performed a deceleration operation, the driving assistance method comprising:

a step of, when determination is made, based on an environment ahead of the learning vehicle at a time when the driver performed the deceleration operation, that the deceleration operation was performed due to a deceleration request object that was provided ahead of the deceleration position and required the learning vehicle to decelerate, adding a higher score to a learning score of the deceleration position than a score when determination is made that the deceleration operation was not performed due to the deceleration request object; and a step of causing the first vehicle to execute the deceleration control when the learning score of the deceleration position reached by the first vehicle is equal to or higher than a threshold value.

* * * * *